Sept. 15, 1925.  
W. J. CLOUD  
1,553,508  
GUIDE FOR OXYACETYLENE TORCHES  
Filed Aug. 14, 1923 3 Sheets-Sheet 1
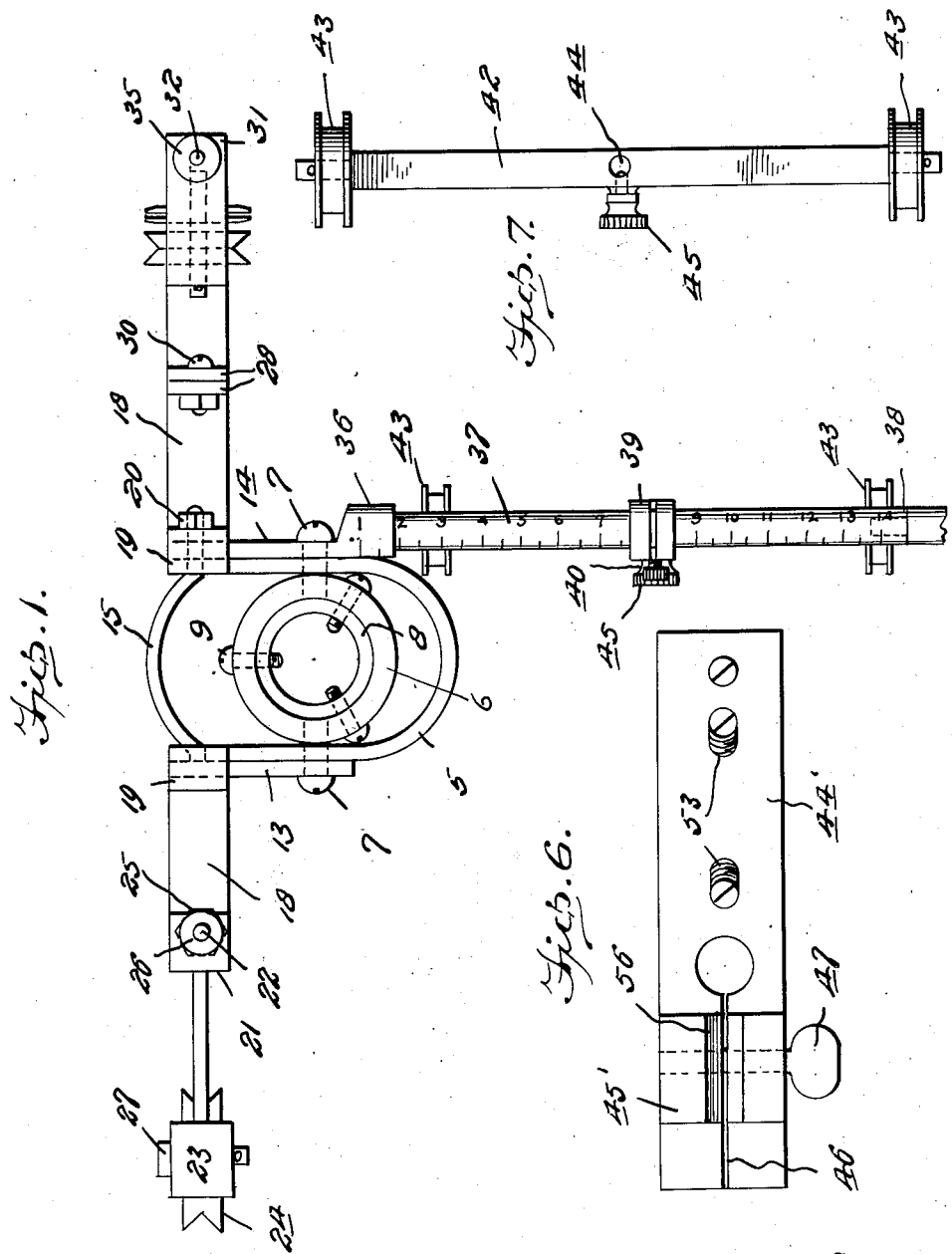

Sept. 15, 1925.

W. J. CLOUD 1,553,508

GUIDE FOR OXYACETYLENE TORCHES

Filed Aug. 14, 1923    3 Sheets-Sheet 2

Inventor
Wm. J. Cloud

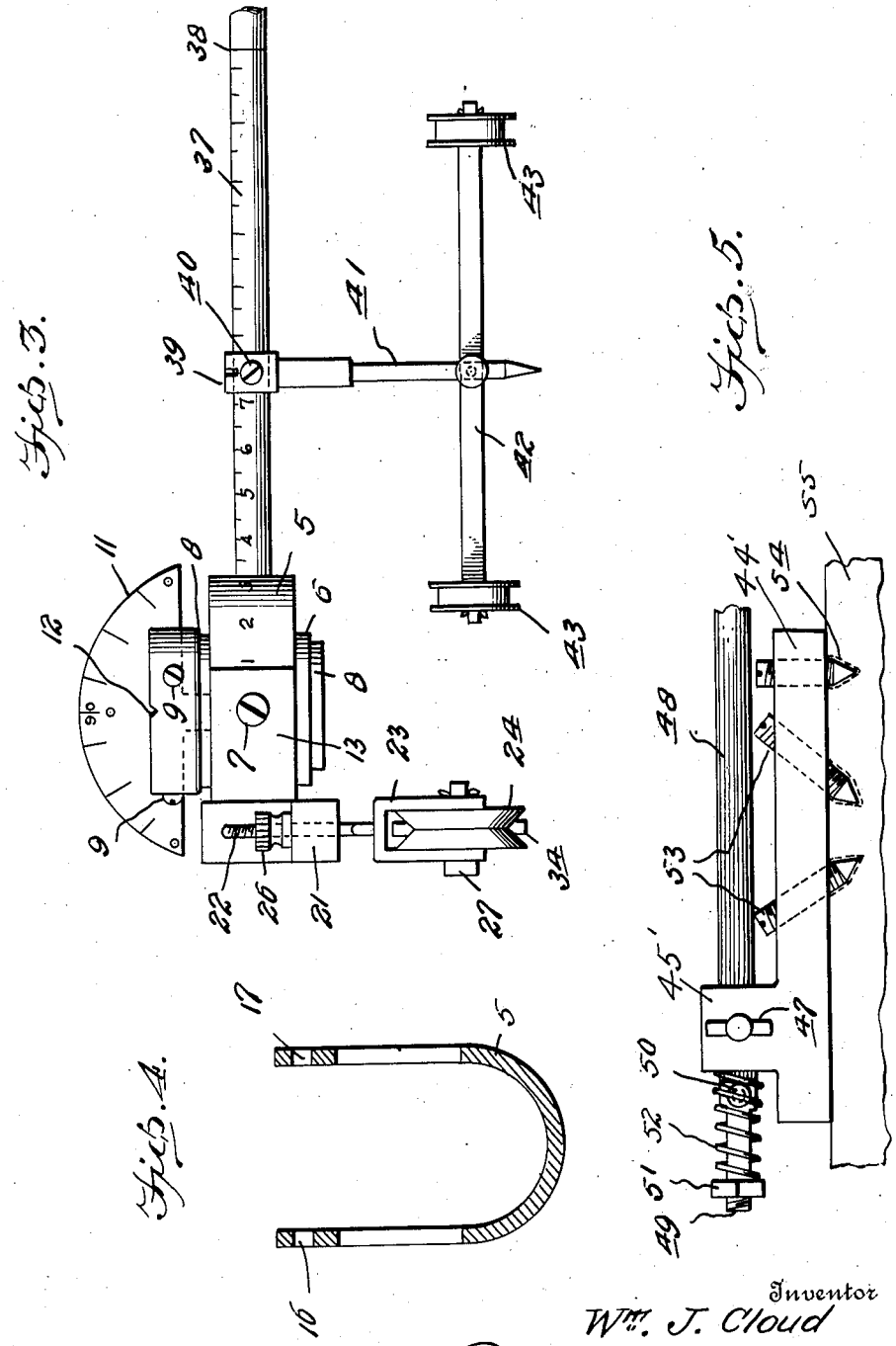

Patented Sept. 15, 1925.

1,553,508

UNITED STATES PATENT OFFICE.

WILLIAM J. CLOUD, OF HILLYARD, WASHINGTON.

GUIDE FOR OXYACETYLENE TORCHES.

Application filed August 14, 1923. Serial No. 657,443.

*To all whom it may concern:*

Be it known that WILLIAM J. CLOUD, citizen of the United States, residing at Hillyard, in the county of Spokane and State of Washington, has invented certain new and useful Improvements in Guides for Oxyacetylene Torches, of which the following is a specification.

This invention relates to apparatus for cutting metal, and has particular reference to the provision of an improved guide carriage and track for oxyacetylene torches.

The primary object of the invention is to provide a guide device by means of which the torch may be moved in a convenient and accurate manner for making a straight, curvilinear or other form of cut.

Another object of the invention is to provide a device for guiding the discharge end or nozzle of an oxyacetylene torch to accurately and easily cut circular openings in metal plates or structures for which such torches are particularly adapted.

Another object of the invention is to provide a device of the character as defined above which is adapted to be rigidly engaged with the torch and is equipped with means whereby rotation of the nozzle of the torch relative to carrying parts of the mechanism is rendered free and easy so as to avoid any possibility of hesitation or interruption of the continuous movement of the torch to cut as desired.

A further object of the invention is to provide means whereby the rotating supporting wheels for the carriage may under certain conditions be locked against pivotal movement about their vertical axes or about axes transverse to their axes of rotation.

A still further object of the invention is to provide a guide carriage for oxyacetylene torches which combines simplicity of construction and economy of production with efficiency and convenience of operation.

With the above general objects in view, and many others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views, Figure 1 is a top plan view of a torch guide constructed in accordance with the present invention, partly broken away, Figure 2 is a side elevational view of the device shown in Figure 1, Figure 3 is a rear elevational view of the device shown in Figure 1, Figure 4 is a horizontal sectional view of the U-shaped member for supporting the pivoted nozzle holding member, Figure 5 is a fragmentary side elevational view illustrating a form of track construction for the carriage or guide shown in Figure 1, Figure 6 is a top plan view of the track anchoring and attaching shoe shown in Figure 5, Figure 7 is an enlarged elevational view of the adjustable carriage for the center point, and Figure 8 is a fragmentary perspective view illustrating a detail of the carriage construction of the guide.

Referring more in detail to the drawings, the present invention embodies a U-shaped member 5 having a bearing sleeve 6 mounted between the legs thereof by means of set screws 7 which extend transversely through the legs of the member 5 and are threaded into the bearing sleeve 6 for clamping the latter against revolution about axes defined by the longitudinal axes of the screws 7. These screws 7 pass through slots in the legs of the member 5, and it is noted that when the screws 7 are loosened, the sleeve 6 may be tilted about said screws as pivots to any desired inclined position. The tubular member or sleeve 8 is loosely mounted within the bearing sleeve 6, and is adapted for reception of the nozzle of an oxyacetylene burner which may be rigidly clamped therein by means of the set screws 9 extending through the enlarged upper end of the sleeve 8 as shown in Figures 1 and 2. Suitable ball bearings 10 are disposed between the members 6 and 8 so as to permit the latter member to rotate freely about a vertical axis. A segmental graduated indicating plate 11 is fixed to and projects upwardly from one leg of the member 5 at one side of the nozzle receiving sleeve 8, and the latter is provided in its upper edges with sight notches 12 adapted to align with desired ones of the graduations of the indicating plate 11 so as to accurately position the torch nozzle at the required inclination from a vertical position.

Plates 13 and 14 are secured against the outer faces of the legs of the member 5 by means of the screws 7, and the plate 13 has a curved brace member 15 rigidly fixed thereto which extends through an opening 16 in the free end of the adjacent leg of the member 5 and also through an aligned opening 17 in the other leg of said member 5 as well as through the plate 14. Arms 18 project laterally from the inner ends of the legs of the member 5 in opposite directions, and each of these arms include inner bifurcated portions 19 which embrace the adjacent portions of the members 5 and 13 and 14 as shown in Figure 2, the bifurcated portions 19 of one arm 18 being suitably secured as by soldering or brazing to the adjacent plate 13 and leg of the member 5. The other arm 18 has its bifurcated portion 19 secured against the plate 14 by means of a nut 20 which is threaded upon the free end of the brace member 15 which extends through the same. The arm 18 extending from the plate 13 has its outer end returnbent as at 21 so as to provide a substantially U-shaped portion having aligned and vertical openings through which loosely extends the stem 22 of a swiveled mount 23 for a caster wheel or rotatable supporting element 24 of the carriage. Between the legs of the U-shaped portion 21 there is disposed a nut 25 which is threaded upon the stem 22, and another nut 26 is threaded upon said stem above the said U-shaped portion 21. These nuts provide efficient means for retaining the casters against movement or rotation about the axes of the stems 22 or axes which extend transversely to the axes of rotation of the wheel or roller 24 as noted at 27.

The other arm 18 may be made in sections having adjacent ends flanged as at 28 and provided with vertical elongated slots 29 whereby the sections may be adjustably clamped together by means of bolts 30. The outer section of the arm 18 terminates in a bifurcated free end portion 31 having vertically aligned openings through which loosely extends the stem 32 of the mount 33 of another rotatable supporting element or roller 34 of the carriage. The upper end of the stem 32 carries a nut 35 by means of which the mount 33 may be fixed against swinging about the stem 32.

The inner end of the plate 14 is formed with a tubular socket 36 in which is held removably one end of a graduated bar 37 which may be formed of jointed sections as generally denoted at 38. A sleeve 39 is movable longitudinally on the bar 37, and this sleeve is clamped in any desired adjusted position by means of a set screw 40 threaded therethrough and positioned to engage the bar 37. The sleeve 39 carries a depending center point 41 for engaging a surface to be operated upon and affording a fulcrum about which the carriage is adapted to be manually rotated. In this manner the wheels 24 and the center point 41 furnish a three point bearing for the carriage when employing the same for describing circular cuts.

In order to maintain a three point bearing for the carriage when the same is moved in a straight path for making a rectilinear cut, a sub-carriage or truck 42 is adjustably associated with the center point 41. This truck embodies a transverse bar having wheels 43 journaled upon the ends thereof and provided with a central opening as at 44 through which the center point 41 slidably extends, the bar being further provided with a set screw 45 adapted to engage the center point 41 for clamping the truck to said center point with the lower end of the center point positioned at a point either above or below the lowest points on the wheels 43. When the truck 42 is lowered the center point 41 is held above the surface of the material operated upon and the wheels 43 then furnish a rolling contact or point of support for the carriage. It will be apparent that when the point 41 is engaged with the surface of the material operated upon for cutting in a circular path, the truck 42 will be elevated and held so positioned by means of a set screw 45.

The wheel 24 is preferably grooved for rolling upon a track used for guiding the carriage in the desired path, and as shown in Figures 5 and 6, this track is of special construction. A pair of opposed track supporting and securing dogs or shoes are required of the form shown in these latter mentioned figures, and these dogs embody an elongated block 44' having an upwardly extending projection 45' adjacent one end, the projection and the dogs being longitudinally split as at 46 at this end to provide a pair of spring jaws which may be brought together by means of a winged bolt 47 threaded through the projection 45. In making oval cuts, a resilient spring track is employed consisting of a thin strip of springy metal as indicated at 48 in Figure 5, one end of the strip 48 being anchored to each of the pair of dogs as shown in this figure. This connection of the track to the dogs embodies a bolt 49 having its inner end split and provided with a transverse clamping screw 50 for securing the adjacent end of the strip 48 therein, the outer end of the screw 49 being provided with an adjustable nut 51, and a helical compression spring 52 being disposed between the nut 51 and the adjacent side of the enlargement 45'. When using this form of track for curvilinear cuts, the winged bolt 47 is loose so that the track strip 48 may move through the slit 46 as yieldingly allowed by means of the compression spring 52. The portion of the dog 44' is provided with a plurality of transverse threaded openings which extend in different directions therethrough as shown in Figure 5, one opening being at right angles to the longitudinal axis of the dog and the others inclining in opposite direction with respect thereto. These screws 53 have pointed ends adapted to engage in a punch mark as at 54 in the material 55 upon which the track is placed and it is to be understood that only one screw is employed at a time in each dog, the left hand screw being used in the installment of the track as shown in Figure 5, and the central screw being employed when the track extends in an opposite direction from the dogs. The remaining screw may be employed for engagement with the edge of the plate when the latter is arranged vertically for being cut.

The enlargement 45 of the dog is provided with a longitudinal V-shaped notch 56 in its upper end in which may be seated a bar of rectangular cross-section in case a rigid track is to be employed, this bar having its end threaded to receive a nut adapted to engage the outer face of the enlargement 45 of the pair of dogs employed so as to prevent separation of the dogs and to hold their screws 43 into the punch marks of the material. With a spring strip track employed, it will be seen that the dogs may swing laterally about the screw 53 as a pivot by simply pushing in a lateral direction upon the carriage so that the track may be flexed to the desired extent for cutting upon curvilinear lines such as is necessary when making oval cuts or the like.

When the parts constructed and arranged as illustrated and described herein, the operation will be readily understood. When a rigid rail is employed, it will be secured upon the plate by means of the dogs adjacent the point where it is desired to cut a straight line, and the nozzle of the torch is then directed through the sleeve 8 and secured therein by means of the set screws 9. By loosening the screws 7 and tilting the member 8 laterally above said screws as pivot, the torch may be set at the desired angle with reference to the work, its distance from the work being regulated by means of the nuts 25, 26 and 35. The truck 42 is then secured in a lowered position and the carriage is moved along the track by pushing upon the same as desired. When it is desired to make a curvilinear cut, such as the portions of an oval, the track 48 is employed, and lateral pressure is applied to the carriage for flexing the track 48 laterally in accordance with the degree of curvature desired. During this use of the guide, the nuts 25, 26 and 35 are loosened so that the casters may readily rotate above the stems 22 and 32, and the center point 41 is held elevated above the surface of the material being operated upon. In making a truly circular cut, the track is dispensed with and the wheels 43 and 24 together with the wheel 34 are allowed to contact with the surface of the material being operated upon, the center point 41 being engaged in a center punch mark in the material.

From the foregoing description it is believed that the construction and operation as well as the advantages, of the present invention will be readily understood and appreciated by those skilled in the art.

Minor changes may be made without departing from the spirit and scope of the invention as claimed.

What I claim as new is:

1. In a device of the kind specified, a nozzle supporting carriage, a pair of caster wheels for supporting one end thereof, bearings on said carriage for the pintles of the caster wheels, and manually operable means associated with said bearing and pintles for firmly holding said pintles against rotation in said bearing and for vertically adjusting said pintles to regulate and vary the elevation of the nozzle from the surface to be operated upon.

2. A movable support for a cutting torch comprising a centrally disposed bearing, a torch clamping device carried by said bearing, a plurality of horizontally disposed supporting arms radiating from said bearing, surface engaging rollers carried by the outer ends of opposed arms, a depending fulcrum carried by the remaining arm, and a roller supported truck carried by and vertically adjustable on said fulcrum.

3. A movable support for a cutting device comprising a holder for said device, a carriage for said holder comprising opposed supporting arms having surface engaging elements at their outer ends, a calibrated bar connected to said holder at its inner end and extending outwardly therefrom at substantial right angles to said carriage, a surface engaging fulcrum longitudinally adjustable upon said bar, and a detachable roller supported truck carried by said fulcrum.

4. A movable support for a cutting device comprising a substantially U-shaped supporting member, a holder disposed between the arms of said member and pivotally and adjustably connected therewith, a carriage for said member, said carriage comprising opposed arms extending in opposite directions from the arms of the supporting members, wheeled mounts pivotally and adjustably connected to the outer ends of said arms, surface engaging wheels carried by said mounts, a calibrated bar rigidly connected at its inner end to the aforesaid supporting member and extending in a direction at right angles to said arms, a work engaging fulcrum point longitudinally adjustable upon said bar, and a wheel supported truck detachably connected with said fulcrum and vertically adjustable upon the same.

In testimony whereof I affix my signature.

WILLIAM J. CLOUD.